US012766705B2

(12) United States Patent
Oumi

(10) Patent No.: US 12,766,705 B2
(45) Date of Patent: Oct. 20, 2026

(54) SIMULATION DEVICE FOR CALCULATING OPERATING STATE OF ROBOT DEVICE

(71) Applicant: Fanuc Corporation, Minamitsuru-gun (JP)

(72) Inventor: Tatsuya Oumi, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 1 day.

(21) Appl. No.: 18/855,445

(22) PCT Filed: Apr. 19, 2022

(86) PCT No.: PCT/JP2022/018153

§ 371 (c)(1),
(2) Date: Oct. 9, 2024

(87) PCT Pub. No.: WO2023/203635

PCT Pub. Date: Oct. 26, 2023

(65) Prior Publication Data

US 2025/0339960 A1 Nov. 6, 2025

(51) Int. Cl.
*B25J 9/16* (2006.01)

(52) U.S. Cl.
CPC ............. *B25J 9/1605* (2013.01); *B25J 9/163* (2013.01); *B25J 9/1653* (2013.01)

(58) Field of Classification Search
CPC ........ B25J 9/1605; B25J 9/163; B25J 9/1653; B25J 9/1671
See application file for complete search history.

(56) References Cited

U.S. PATENT DOCUMENTS

| | | | | |
|---|---|---|---|---|
| 7,386,428 | B1 | 6/2008 | Hallquist et al. | |
| 11,169,511 | B2 * | 11/2021 | Cella | B62D 15/0215 |
| 11,360,459 | B2 * | 6/2022 | Cella | B62D 15/0215 |
| 11,609,552 | B2 * | 3/2023 | Cella | B62D 15/0215 |
| 12,554,905 | B2 * | 2/2026 | Iwamura | B25J 9/1671 |
| 2007/0050091 | A1 * | 3/2007 | Nagatsuka | B25J 9/1671 700/259 |

(Continued)

FOREIGN PATENT DOCUMENTS

| | | | |
|---|---|---|---|
| CN | 114206562 | A | 3/2022 |
| JP | H0352003 | A | 3/1991 |

(Continued)

OTHER PUBLICATIONS

Int'l Search Report (PCT/ISA/210) w/ translation & Written Opinion (PCT/ISA/237) mailed on Jul. 19, 2022, by the Japanese Patent Office in Int'l App. No. PCT/JP2022/018153 (9 pages).

*Primary Examiner* — Bhavesh V Amin
(74) *Attorney, Agent, or Firm* — BUCHANAN INGERSOLL & ROONEY PC

(57) ABSTRACT

A simulation device includes a simulation executing unit for carrying out a simulation of an operation of a robot device by means of a three-dimensional model; a target point setting unit for setting target points for polygons representing a surface of the three-dimensional model; a position calculating unit for calculating positions for all target points at a predetermined time; and an operating state calculating unit for calculating at least one variable among a speed and an acceleration of the target points on the basis of the positions of the target points at each time.

4 Claims, 6 Drawing Sheets

(56) References Cited

U.S. PATENT DOCUMENTS

| | | | | |
|---|---|---|---|---|
| 2013/0035789 | A1* | 2/2013 | Takeda | B25J 9/1674 700/245 |
| 2013/0218542 | A1* | 8/2013 | Yerli | G06F 30/20 703/6 |
| 2017/0004237 | A1 | 1/2017 | Sasaki | |
| 2017/0165841 | A1* | 6/2017 | Kamoi | B25J 9/1671 |
| 2017/0232614 | A1 | 8/2017 | Takeda | |
| 2017/0235300 | A1* | 8/2017 | Maruno | G06T 7/74 700/112 |
| 2019/0041836 | A1* | 2/2019 | Cella | B62D 15/0215 |
| 2019/0129408 | A1* | 5/2019 | Cella | B62D 15/0215 |
| 2019/0146477 | A1* | 5/2019 | Cella | B62D 15/0215 702/188 |
| 2019/0146482 | A1* | 5/2019 | Cella | B62D 15/0215 702/188 |
| 2019/0221037 | A1 | 7/2019 | Sugaya | |
| 2021/0178578 | A1* | 6/2021 | Nakai | B25J 9/1671 |
| 2022/0292234 | A1* | 9/2022 | Iwamura | B25J 9/1671 |
| 2024/0273793 | A1* | 8/2024 | DeCharms | G06F 40/109 |

FOREIGN PATENT DOCUMENTS

| | | | |
|---|---|---|---|
| JP | 2008100315 | A | 5/2008 |
| JP | 2014014876 | A | 1/2014 |
| JP | 2017016458 | A | 1/2017 |
| JP | 2017144514 | A | 8/2017 |
| JP | 2019123052 | A | 7/2019 |
| WO | 2019064919 | A | 4/2019 |

* cited by examiner

SIMULATION DEVICE FOR CALCULATING OPERATING STATE OF ROBOT DEVICE

CROSS REFERENCE TO RELATED APPLICATIONS

This is the U.S. National Phase application of PCT/JP2022/018153 filed Apr. 19, 2022, the disclosure of this application being incorporated herein by reference in its entirety for all purposes.

FIELD OF THE INVENTION

The present invention relates to a simulation device for calculating an operating state of a robot device.

BACKGROUND OF THE INVENTION

In a robot device including a robot and a work tool, the robot can change the position and orientation of the work tool by changing its position and orientation. A robot device can perform various types of work while changing the position and orientation of a work tool (e.g., Japanese Unexamined Patent Publication No. 2014-14876A). The position and orientation of a robot are changed based on an operation program. In the operation program, a teach point at which the position and orientation of the robot are defined is set. The teach point can be taught by driving an actual robot.

A simulation device which performs simulation of the operation of a robot device in order to generate a teach point of the robot device is known (e.g., Japanese Unexamined Patent Publication No. H3-52003A). With a simulation device, an operator can confirm, with an image, the operation of the robot device. In particular, a simulation device which displays a moving image of a robot device is known (e.g., Japanese Unexamined Patent Publication No. 2008-100315A). By performing simulation of the operation of the robot device by the simulation device, the operator can generate or correct an operation program without driving an actual robot device.

Patent Literature

PTL 1: Japanese Unexamined Patent Publication No. 2014-14876A

PTL 2: Japanese Unexamined Patent Publication No. H3-52003A

PTL 3: Japanese Unexamined Patent Publication No. 2008-100315A

SUMMARY OF THE INVENTION

It is known that a simulation device in the prior art calculates a speed or an acceleration at which a tool center point moves as an operating state of a robot device. Alternatively, it is known that a rotation speed and a rotation acceleration of each drive axis of the robot are calculated as the operating state of the robot device. However, there is a problem in that an operating state such as a speed is not known at a position other than the tool center point. There has been a problem in that the operator could not know even if the speed or the like at a predetermined position in a robot device or a workpiece is too fast or too slow. In particular, in the simulation device, an actual robot device is not driven, and thus there is a problem in that it is difficult to know the operating state such as the speed of the robot, a hand, or the workpiece.

One aspect of the present disclosure is a simulation device configured to simulate an operation of a robot device including a robot and a work tool. The simulation device includes a simulation executing unit configured to simulate the operation of the robot device and the operation of a workpiece by a three-dimensional model. The simulation device includes an object point setting unit configured to set an object point for a plurality of elements representing a surface of a three-dimensional model. The simulation device includes a position calculating unit configured to calculate positions at predetermined time points for all the object points during a period in which simulation is performed. The simulation device includes an operating state calculating unit configured to calculate a variable of at least one selected from a group of a speed and an acceleration of the object point based on a position of the object point at each time point. The simulation device includes a display part configured to display information regarding at least one variable calculated by the operating state calculating unit.

According to one aspect of the present disclosure, it is possible to provide a simulation device configured to calculate an operating state at a predetermined position of a robot device or a workpiece.

DETAILED DESCRIPTION OF EMBODIMENTS OF THE INVENTION

The simulation device in an embodiment will be described with reference to FIGS. 1 to 6. The simulation device of the present embodiment is an off-line device configured to simulate the operation of the robot device including the robot and a work tool attached to the robot and the operation of the workpiece. The simulation device of the robot device of the present embodiment can calculate an operating state such as a speed at a discretionary position of the robot device and the workpiece.

Figure 1:
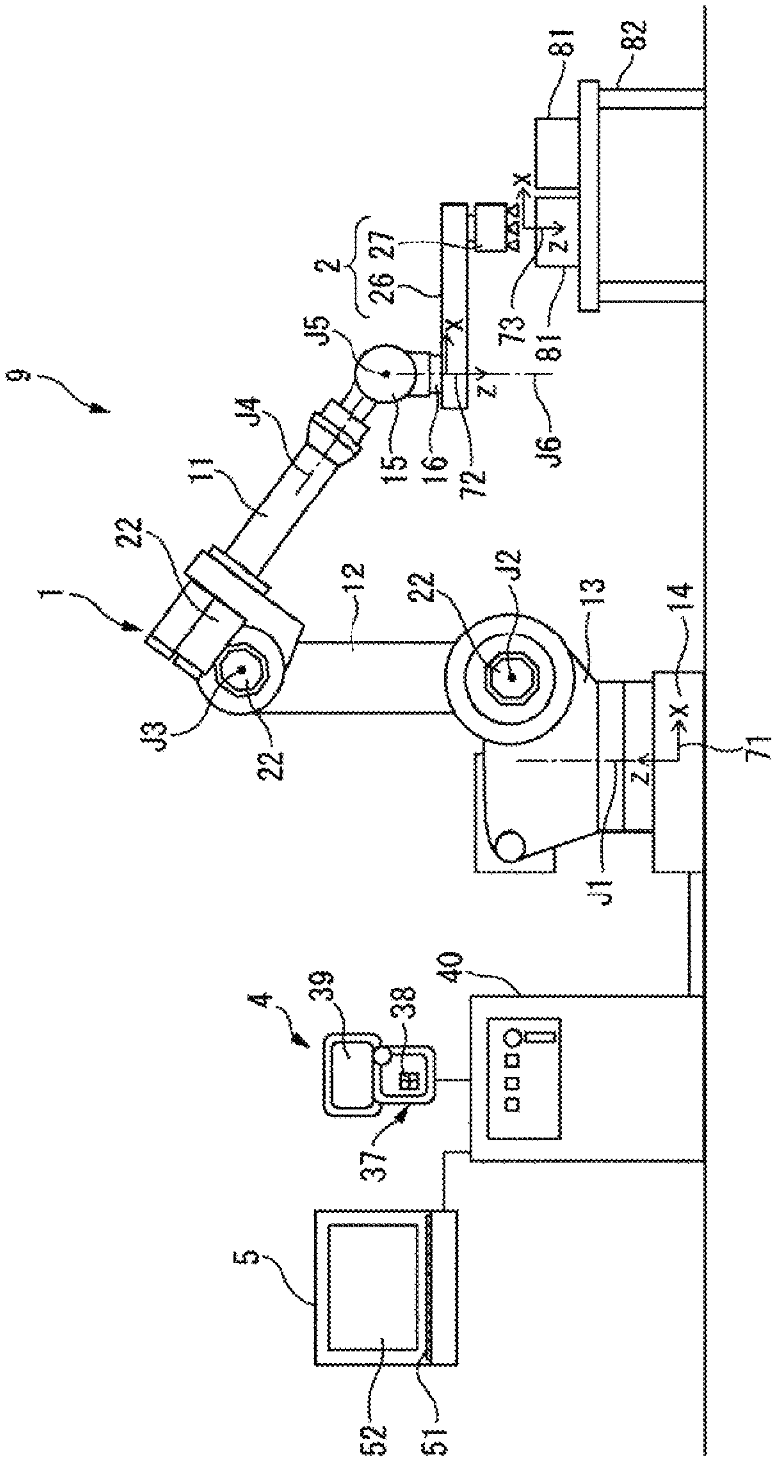
FIG. 1 is a schematic diagram of a robot system in an embodiment.
Figure 2:
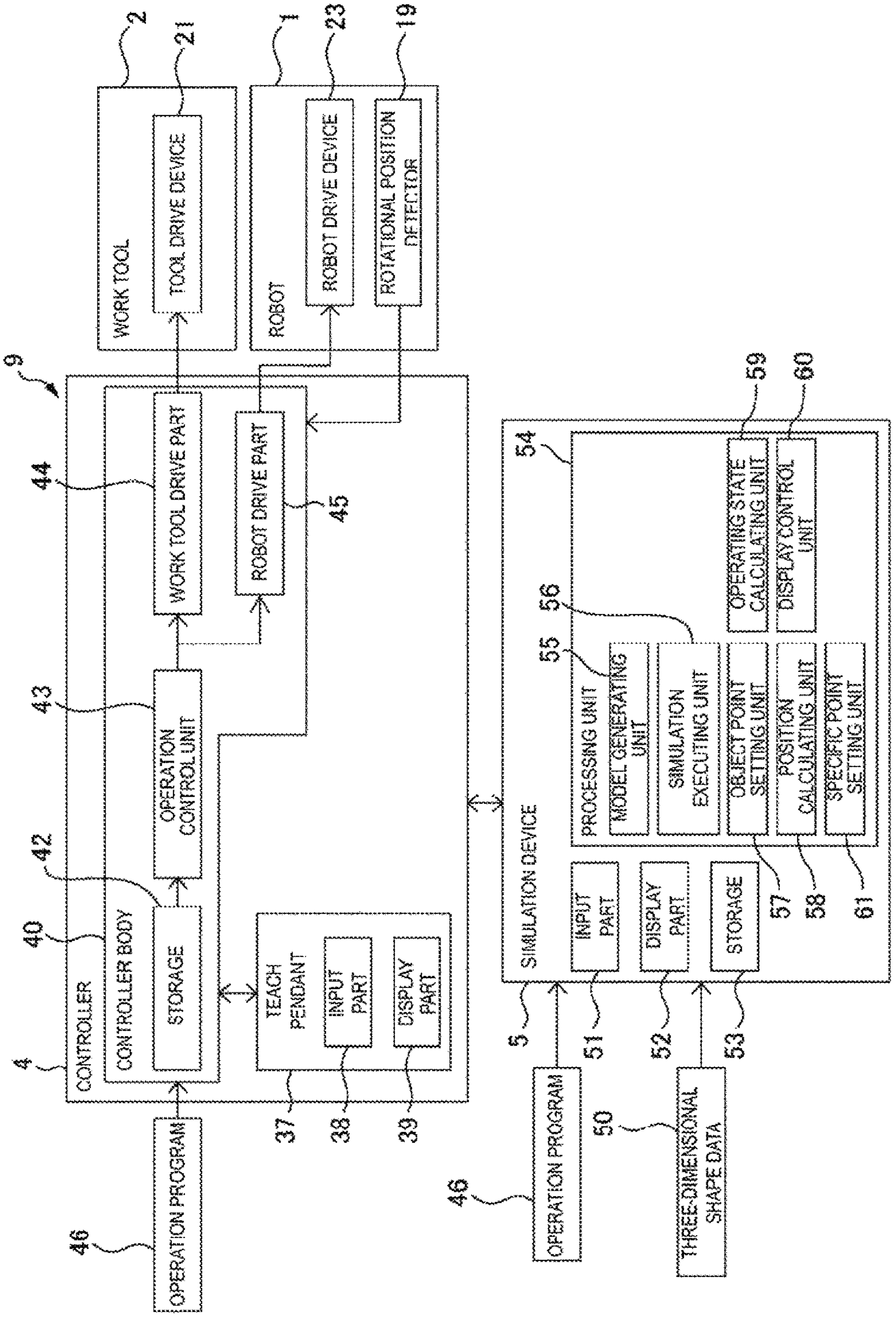
FIG. 2 is a block diagram of the robot system in the embodiment.

FIG. 1 is a schematic view of the robot system in the present embodiment. FIG. 2 is a block diagram of the robot system in the present embodiment. With reference to FIGS. 1 and 2, the robot system includes a robot device 9 and a simulation device 5. The robot device 9 includes a work tool 2 configured to perform a predetermined work on a workpiece 81 and a robot 1 configured to move the work tool 2.

The robot 1 of the present embodiment is an articulated robot including a plurality of joint parts. In particular, the robot 1 of the present embodiment is a vertical articulated robot. The robot 1 includes a plurality of constituent members that are movable. The constituent members of the robot 1 are formed so as to rotate about respective drive axes.

The robot 1 includes a base part 14 fixed to an installation surface and a swivel base 13 supported by the base part 14. The swivel base 13 rotates about a first drive axis J1 with respect to the base part 14. The robot 1 includes an upper arm 11 and a lower arm 12. The lower arm 12 rotates about a second drive axis J2 with respect to the swivel base 13. The upper arm 11 rotates about a third drive axis J3 with respect to the lower arm 12. Furthermore, the upper arm 11 rotates about a fourth drive axis J4, which is parallel to an extending direction of the upper arm 11.

The robot 1 includes a wrist 15 supported by the upper arm 11. The wrist 15 rotates about a fifth drive axis J5. The wrist 15 includes a flange 16 that rotates about a sixth drive axis J6. The work tool 2 is fixed to the flange 16. In the present embodiment, the base part 14, the swivel base 13, the lower arm 12, the upper arm 11, the wrist 15, and the work tool 2 correspond to the constituent members of the robot device 9. The robot 1 of the present embodiment includes the six drive axes, but is not limited to this configuration. A robot configured to change the position and orientation by a discretionary mechanism can be employed.

The work tool 2 in the present embodiment is a hand that grips the workpiece 81 by suction. The workpiece 81 of the present embodiment is a rectangular parallelepiped box. The robot device 9 of the present embodiment grips and conveys, to a target position, the workpiece 81 placed on a mount 82.

The work tool 2 of the present embodiment includes a bar-shaped member 26 fixed to the flange 16 of the robot 1 and a suction member 27 fixed to the tip of the bar-shaped member 26. The bar-shaped member 26 is fixed to the flange 16 so as to extend in a direction perpendicular to the drive axis J6. The bar-shaped member 26 functions as a member supporting the suction member 27. The suction member 27 includes a plurality of suction pads configured to adsorb the surface of the workpiece 81.

The work tool attached to the robot 1 is not limited to this embodiment, and a discretionary end effector in response to the work performed by the robot device can be employed. For example, a work tool configured to perform welding, a work tool configured to apply a sealing material to a surface of a workpiece, or the like can be employed.

A robot coordinate system 71, which is a coordinate system having a fixed position and a fixed direction of coordinate axes, is set in the robot device 9. The robot coordinate system 71 is called a world coordinate system. In the robot device 9, a flange coordinate system 72 having an origin at the flange 16 of the wrist 15 is set. The flange coordinate system 72 is a coordinate system configured to move and rotate together with the flange 16. Furthermore, a tool coordinate system 73 having an origin set at a discretionary position of the work tool 2 is set in the robot device 9. The origin of the tool coordinate system 73 of the present embodiment is set at the tool center point. The tool coordinate system 73 is a coordinate system configured to move and rotate together with the work tool 2. The relative position and orientation of the tool coordinate system 73 with respect to the flange coordinate system 72 are constant and predetermined.

The position of the robot 1 corresponds to the position of the origin of the tool coordinate system 73 in the robot coordinate system 71, for example. The orientation of the robot 1 corresponds to the direction of the tool coordinate system 73 with respect to the robot coordinate system 71.

The robot 1 includes a robot drive device 23 configured to change the position and orientation of the robot 1. The robot drive device 23 includes a plurality of drive motors 22 configured to drive constituent members of the robot such as an arm and a wrist. In the present embodiment, the plurality of drive motors 22 are arranged corresponding to the plurality of drive axes J1 to J6. The robot device 9 includes a tool drive device 21 configured to drive the work tool 2. The tool drive device 21 includes a motor for driving a work tool, a cylinder, and an electromagnetic valve, for example. The tool drive device 21 of the present embodiment drives the suction member 27 by air pressure. The tool drive device 21 includes a pump and an electromagnetic valve for decompressing the space inside the suction pads.

The robot device 9 includes a controller 4 configured to control the robot 1 and the work tool 2. The controller 4 includes a controller body 40 configured to perform control, and a teach pendant 37 for an operator operating the controller body 40. The controller body 40 includes an arithmetic processing device (computer) including a central processing unit (CPU) as a processor. The arithmetic processing device includes a random access memory (RAM) and a read only memory (ROM) connected to the CPU via a bus.

The teach pendant 37 is connected to the controller body 40 via a communication device. The teach pendant 37 includes an input part 38 for inputting information regarding the robot 1 and the work tool 2. The input part 38 is configured by input members such as a keyboard and a dial. The teach pendant 37 includes a display part 39 configured to display information regarding the robot 1 and the work tool 2. The display part 39 can include a discretionary display that can display an image. For example, the display part 39 can be configured by a display panel such as a liquid crystal display panel or an organic electro luminescence (EL) display panel.

An operation program 46 created in advance for operating the robot 1 and the work tool 2 is input to the controller 4. Alternatively, teach points of the robot 1 can be set by the operator operating the teach pendant 37 and driving the robot 1. The controller 4 can generate the operation program 46 for the robot 1 and the work tool 2 based on the teach points.

The controller body 40 includes an operation control unit 43 configured to control the operation of the robot 1 and the work tool 2. The operation control unit 43 sends a robot drive part 45 an operation command for driving the robot 1, based on the operation program 46. The robot drive part 45 includes an electric circuit configured to drive the robot drive device 23. The robot drive part 45 supplies electricity to the robot drive device 23 based on the operation command. The operation control unit 43 sends a work tool drive part 44 an operation command for driving the work tool 2 based on the operation program 46. The work tool drive part 44 includes an electric circuit configured to drive the tool drive device 21. The work tool drive part 44 supplies electricity to the tool drive device 21 based on the operation command.

The controller body 40 includes a storage 42 configured to store information regarding the control of the robot 1 and the work tool 2. The storage 42 can include a non-transitory storage medium that can store information. For example, the storage 42 can be configured by a storage medium such as a volatile memory, a nonvolatile memory, a magnetic storage medium, or an optical storage medium. The operation program 46 is stored in the storage 42.

The operation control unit 43 corresponds to a processor driven in accordance with the operation program 46. The operation control unit 43 is formed so as to read the information stored in the storage 42. The processor reads the operation program 46 and performs a control defined in the operation program 46, thereby functioning as the operation control unit 43.

The robot 1 includes a rotational position detector 19 configured to detect the position and orientation of the robot 1. The rotational position detector 19 in the present embodiment is attached to the drive motor 22 of each of the drive axes. The position and orientation of the robot 1 are detected based on the output of the plurality of rotational position detectors 19.

The simulation device 5 of the present embodiment arranges a three-dimensional model of the robot 1, a three-dimensional model of the work tool 2, and a three-dimensional model of the workpiece 81 in an identical virtual space, and performs simulation of the operation of the robot device 9 and the operation (movement) of the workpiece 81.

The simulation device 5 of the present embodiment includes an arithmetic processing device (computer) including a CPU as a processor. The simulation device 5 includes a storage 53 configured to store discretionary information regarding simulation of the robot device 9. The storage 53 can be configured by a non-transitory storage medium that can store information. For example, the storage 53 can include a storage medium such as a volatile memory, a nonvolatile memory, a magnetic storage medium, or an optical storage medium. A program for simulation for performing simulation of the robot device 9 is stored in the storage 53.

The simulation device 5 includes an input part 51 for inputting information regarding the simulation of the robot device 9. The input part 51 is configured by an operation member such as a keyboard, a mouse, and a dial. The simulation device 5 includes a display part 52 configured to display information regarding the simulation of the robot device 9. The display part 52 can include a discretionary display that can display an image. For example, the display part 52 can be configured by a display panel such as a liquid crystal display panel or an organic electro luminescence (EL) display panel. The display part 52 displays an image of a model of the robot device 9 and an image of a model of the workpiece 81. When the simulation device includes a touch-screen display panel, this display panel functions as an input part and a display part.

Three-dimensional shape data 50 necessary for simulation is input to the simulation device 5. The three-dimensional shape data 50 includes three-dimensional shape data of a robot, a work tool, and a workpiece for performing simulation of the robot device. As the three-dimensional shape data 50, design data output from a computer aided design (CAD) device, for example, can be used. The three-dimensional shape data of each member of the present embodiment is generated by polygons as a plurality of elements representing the surface of the member. In the present embodiment, shape data in which triangular polygons are arranged along the surface of the member is generated. The polygon functions as a microelement whose surface is divided. The element is not limited to this form, and a discretionary polygonal shape such as a quadrangle can be employed. The three-dimensional shape data 50 is stored in the storage 53.

Figure 3:
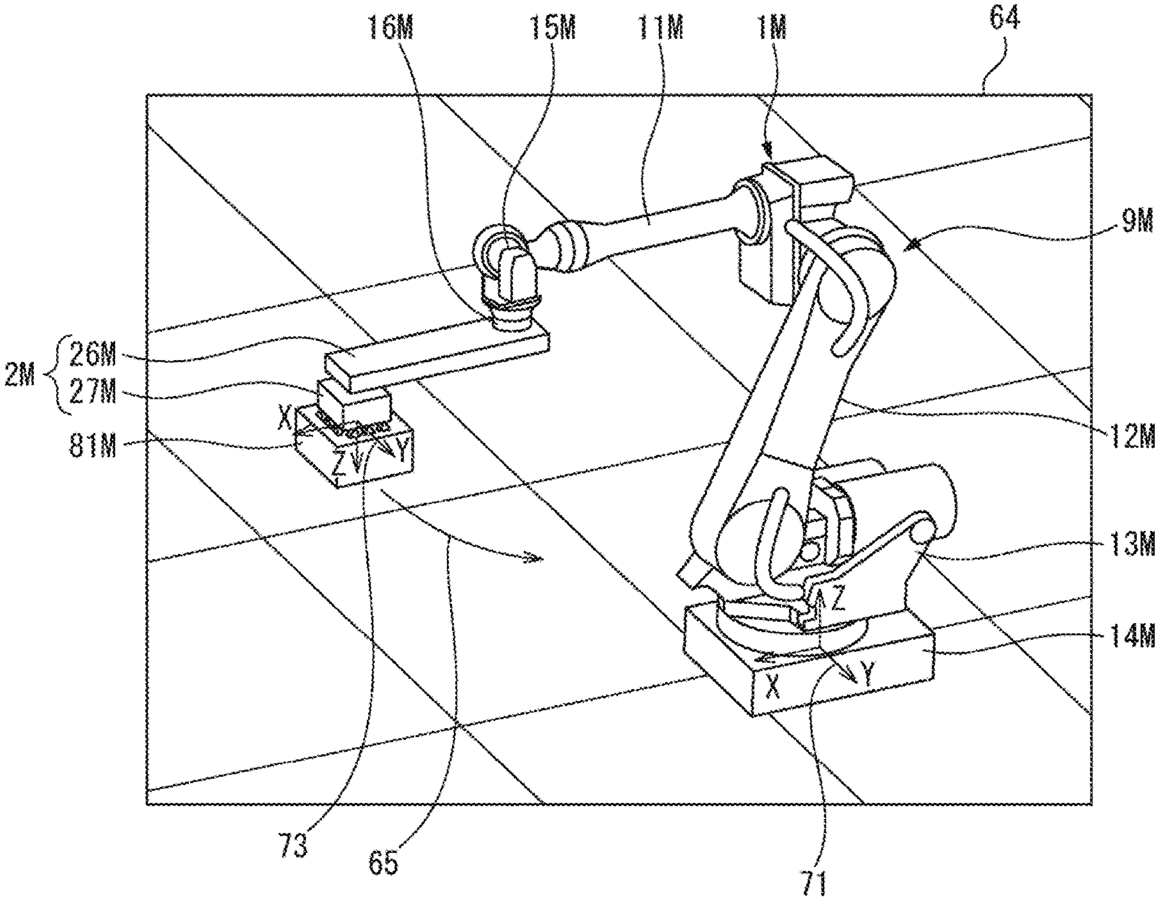
FIG. 3 is an image of a robot device and a workpiece displayed on a display part of the simulation device.

FIG. 3 illustrates an example of an image when the simulation displayed on the display part is being performed. With reference to FIGS. 2 and 3, the simulation device 5 of the present embodiment generates a moving image for simulating the operation of the robot device 9. The simulation device 5 displays the operations of the robot device 9 and the workpiece 81 in animation.

The simulation device 5 includes a processing unit 54 configured to perform arithmetic processing for simulation. The processing unit 54 includes a model generating unit 55 configured to generate a robot device model 9M including a robot model 1M and a work tool model 2M and a workpiece model 81M based on the three-dimensional shape data 50 of the robot 1, the work tool 2, and the workpiece 81.

The model generating unit 55 generates a model of a member to be arranged in the virtual space based on the three-dimensional shape data 50. The model generating unit 55 of the present embodiment generates a three-dimensional model of each member with polygons. In the present embodiment, since the three-dimensional shape data 50 is generated by polygons, the model generating unit 55 can easily generate a three-dimensional model from the three-dimensional shape data 50.

On the other hand, the three-dimensional shape data may be generated from a model that does not use a polygon such as a solid model. Alternatively, in the three-dimensional shape data, a curved line or a curved surface may be defined by a mathematical expression. In this case, the model generating unit generates a three-dimensional model in which the surface of the member is configured by polygons based on information included in the three-dimensional shape data.

The model generating unit 55 generates a model for each constituent member for the robot model 1M. The model generating unit 55 generates the robot model 1M including a base part model 14M, a swivel base model 13M, a lower arm model 12M, an upper arm model 11M, a wrist model 15M, and a flange model 16M. The model generating unit 55 generates the work tool model 2M including a bar-shaped member model 26M and a suction member model 27M.

The model generating unit 55 generates the workpiece model 81M based on the three-dimensional shape data 50 of the workpiece 81. It should be noted that the model generating unit 55 may acquire three-dimensional shape data of a peripheral device disposed around the robot and generate a model of the peripheral device disposed around the robot.

The processing unit 54 includes a simulation executing unit 56 configured to perform simulation of the work of the robot device 9. The simulation executing unit 56 performs simulation of the operation of the robot device 9 and the operation (movement) of the workpiece 81 by a three-dimensional model. In the virtual space, the robot coordinate system 71, the tool coordinate system 73, and the like are set as coordinate systems.

The simulation executing unit 56 calculates the positions and orientations of the model of the constituent member of the robot 1, the model of the constituent member of the work tool 2, and the model of the workpiece 81 based on the operation program 46. The simulation executing unit 56 arranges the robot model 1M, the work tool model 2M, and the workpiece model 81M in a three-dimensional virtual space. The simulation executing unit 56 changes the position and orientation of the model of the constituent member of the robot device 9 based on the operation program 46. For example, when the flange model 16M rotates, the workpiece model 81M moves in a direction indicated by arrow 65.

The processing unit 54 includes a display control unit 60 configured to control an image to be displayed on the display part 52. The display control unit 60 generates a three-dimensional image to be displayed on the display part 52. The display control unit 60 of the present embodiment generates an image of a model when viewed from a predetermined viewpoint. For example, the display control unit 60 generates an image 64 when the robot device model 9M and the workpiece model 81M are projected onto a predetermined plane. The display control unit 60 displays the generated image 64 on the display part 52. In addition to the model of the constituent member, discretionary information can be displayed on the image 64. For example, the display control unit 60 can display a coordinate system such as the robot coordinate system 71 and the tool coordinate system 73.

The processing unit 54 includes an object point setting unit 57 configured to set an object point with respect to a polygon as an element representing the surface of a three-dimensional model. The polygon in the present embodiment has a polygonal shape. The object point setting unit 57 can set object points at all corners of the polygon in the polygon.

The processing unit 54 includes a position calculating unit 58 configured to calculate positions at predetermined time points for all the object points during a period in which simulation is performed. The processing unit 54 includes an operating state calculating unit 59 configured to calculate a variable of at least one selected from a group of the speed and the acceleration of the object point based on the position of the object point at each time point. The display control unit 60 displays, on the display part 52, information regarding a variable of at least one selected from a group of the speed and the acceleration of the object point. The processing unit 54 includes a specific point setting unit 61 configured to set a specific point in response to an input operation of the operator in the robot device 9 or the workpiece 81.

The processing unit 54 corresponds to a processor driven in accordance with a program for simulation. The processor reads the program for simulation and performs a control defined in the program, thereby functioning as the processing unit 54. The model generating unit 55, the simulation executing unit 56, the object point setting unit 57, the position calculating unit 58, the operating state calculating unit 59, the display control unit 60, and the specific point setting unit 61 correspond to a processor driven in accordance with the program for simulation. The processor performs the control defined in the program, thereby functioning as respective units.

With reference to FIGS. 1 and 3, the robot device 9 in the present embodiment lifts the workpiece 81 from the mount 82 and conveys the workpiece 81 to a predetermined target position. The work tool 2 includes the bar-shaped member 26 that is elongated. One end part of the bar-shaped member 26 is fixed to the flange 16, and the suction member 27 for adsorbing the workpiece 81 is disposed at the other end part. For example, the work tool 2 is disposed so that the bar-shaped member 26 extends in the horizontal direction. When the flange 16 or the swivel base 13 rotates, a movement distance of the work tool 2 can be increased. For example, the swivel base 13 rotates about the drive axis J1, and the flange 16 rotates about the drive axis J6, whereby the workpiece 81 can be conveyed by a large distance.

When the workpiece 81 is conveyed with the operation of rotating the flange 16, there is a case where the operating state such as the speed and acceleration of the workpiece 81 is not easily understood. There is a case where a speed limit value or an acceleration limit value at the time of movement is set to the workpiece. However, in the simulation device of the prior art, the operating state such as the speed and acceleration in a predetermined part of the workpiece is not known. Alternatively, the operating state such as a speed and an acceleration in a predetermined part of the robot device is not known. Therefore, the simulation device of the present embodiment performs control for calculating the operating state at a predetermined point for the workpiece and the robot device.

Figure 4:
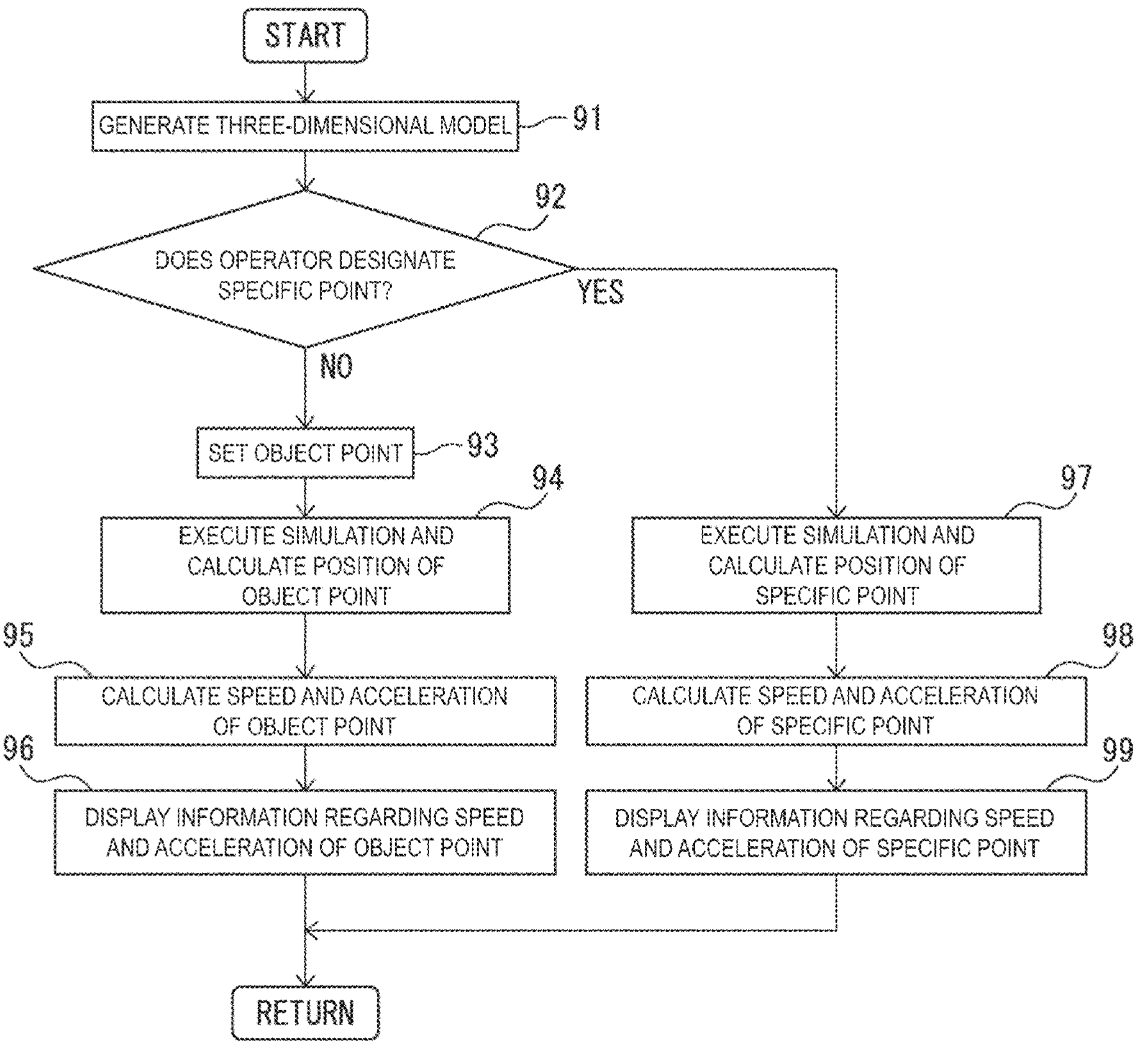
FIG. 4 is a flowchart of control of the simulation device in the embodiment.

FIG. 4 is a flowchart showing control of the simulation device in the present embodiment. With reference to FIGS. 2 to 4, in step 91, the model generating unit 55 generates a three-dimensional model of the constituent members of the robot device and the workpiece based on the three-dimensional shape data 50. In this case, the model generating unit 55 generates the robot device model 9M and the workpiece model 81M.

In step 92, the processing unit 54 determines whether or not the operator designates a specific point in the robot device model 9M or the workpiece model 81M. The specific point is one or more points arranged at discretionary positions in at least one selected from a group of the robot device model 9M and the workpiece model 81M. The specific point can be designated on an image by the operator operating the input part 51 of the simulation device 5.

In step 92, when the operator does not designate the specific point, the control proceeds to step 93. In step 93, the object point setting unit 57 automatically sets an object point in the three-dimensional model. In this case, the object point setting unit 57 sets the object points for all three-dimensional models. The object point corresponds to a point at which an operating state such as a speed and an acceleration is calculated in a subsequent process.

Figure 5:
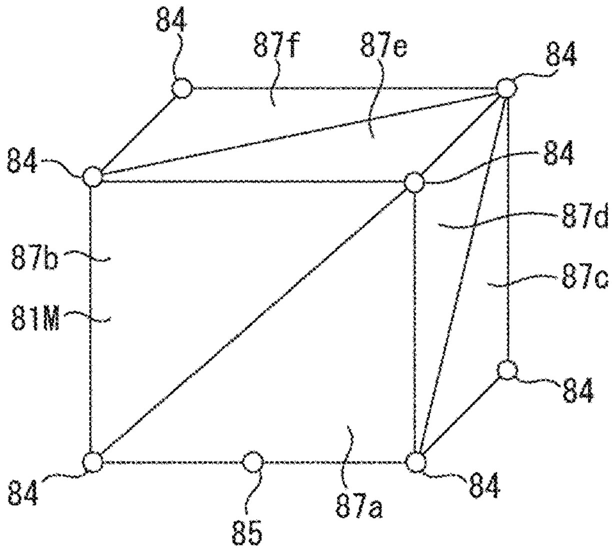
FIG. 5 is a perspective view of a workpiece model describing a polygon in the embodiment.

FIG. 5 is a perspective view of a workpiece model for describing object points set in the workpiece model. In this example, the object point setting unit 57 sets the object point for the workpiece model 81M. Since the workpiece 81 has a rectangular parallelepiped shape, the workpiece model 81M is formed in a rectangular parallelepiped shape. The workpiece model 81M includes polygons 87*a* to 87*f* each having a triangular planar shape. The object point setting unit 57 sets object points 84 at all corners of the polygons 87*a* to 87*f*. In this example, the object points 84 are set at the corners of the triangles of the polygons 87*a* to 87*f*. The object point setting unit 57 performs the control of setting such the object points on all the polygons constituting the robot model 1M and the work tool model 2M.

Next, in step 94, the simulation executing unit 56 performs a simulation of the operation of the robot device model 9M based on the operation program 46. The simulation executing unit 56 changes the position and orientation of the constituent members included in the robot device model 9M. In the virtual space, the robot model 1M is driven and the workpiece model 81M moves. The display control unit 60 displays, on the display part 52, the image 64 of the model when viewed from a predetermined viewpoint.

The position calculating unit 58 calculates the positions at predetermined time points for all the object points 84 during a period in which the simulation of the robot device is performed. For example, assume that the time at which the driving of the robot device is started is 0. The position calculating unit 58 calculates the positions of the object points 84 at predetermined time intervals. As the predetermined time interval, for example, a time interval at which an image of simulation is displayed can be set. Alternatively, the time for calculating the positions of the object points may be set based on a control cycle of the robot. Alternatively, the operator can predetermine the time points for detecting the positions of the object points 84 and input the predetermined time points to the simulation device. The position calculating unit 58 may calculate the positions of the object points 84 at this time points.

The simulation executing unit 56 calculates the position and orientation of each model. For example, the simulation executing unit 56 calculates the positions and orientations of the constituent members such as the swivel base model 13M, the lower arm model 12M, and the wrist model 15M. Then, the position calculating unit 58 calculates, in the robot coordinate system 71, the position and orientation of the robot model 1M. For example, the position calculating unit 58 calculates the position of the origin of the tool coordinate system 73 and the orientation of the tool coordinate system 73 in the robot coordinate system 71.

The relative position of the workpiece model 27M with respect to the suction member model 81M can be predetermined. Alternatively, the position calculating unit 58 may calculate a relative position of the workpiece model 81M with respect to the suction member model 27M during a period in which simulation is performed. The position calculating unit 58 calculates the position in the tool coordinate system 73 of each of the object points 84 set in the workpiece model 81M. In other words, the coordinate value of the tool coordinate system 73 is calculated for each of the object points 84. Alternatively, the position calculating unit 58 may calculate the positions of the object points 84 by using the flange coordinate system 72 in place of the tool coordinate system 73.

The position calculating unit 58 calculates the positions of the object points 84 with the coordinate values of the robot coordinate system 71 based on the position and orientation of the robot model 1M and the positions in the tool coordinate system of the object points 84. The position calculating unit 58 calculates the positions of all the object points 84 set in the workpiece model 81M. Similarly, the position calculating unit 58 calculates, in the robot coordinate system 71, the positions of all the object points set in the work tool model 2M and the robot model 1M. The position calculating unit 58 calculates the positions of all the object points at each predetermined time point.

Figure 6:
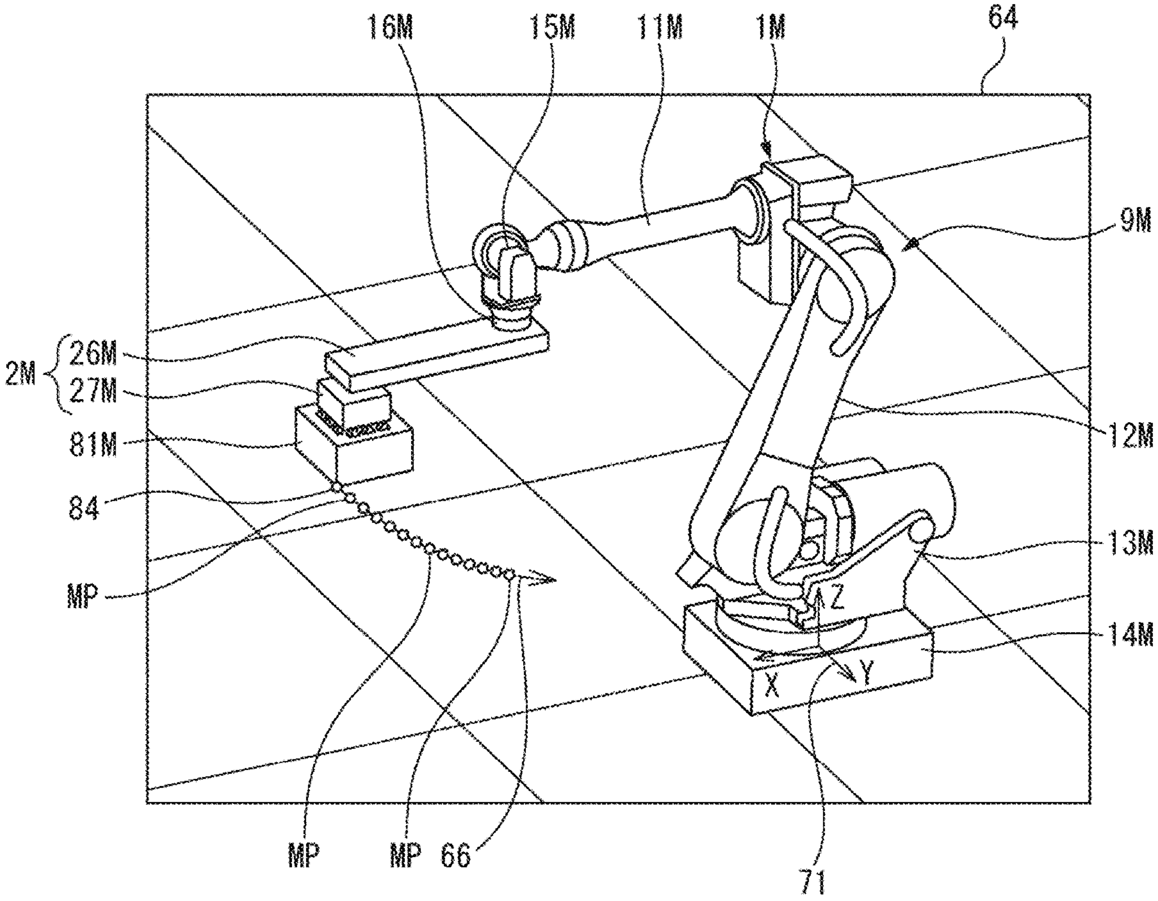
FIG. 6 is an image of simulation illustrating movement of one object point set in a workpiece model.

FIG. 6 illustrates an image of a model of the robot device for describing calculation of the position of the object point. FIG. 6 illustrates the object point 84 disposed at one corner of the workpiece model 81M. The robot model 1M is driven, and the workpiece model 81M moves. The object point 84 moves in the direction indicated by arrow 66 in accordance with the operation of the robot model 1M. At this time, the position calculating unit 58 sets a movement point MP indicating the position of the object point 84 at each predetermined time point.

The position calculating unit 58 calculates the position of each of the movement points MP with the coordinate values of the robot coordinate system 71. The storage 53 stores the position of each of the movement points MP. The position calculating unit 58 can perform this calculation for the object points set for the polygons of all the models.

The position calculating unit 58 can perform calculation of the position of the object point in all periods during which the simulation is performed. Alternatively, the position calculating unit 58 may calculate the position of the object point within a range of predetermined time points. For example, the position calculating unit 58 may calculate the position of the object point 84 in a period from the grasping of the workpiece 81 until the workpiece 81 reaches the target position.

With reference to FIG. 4, in step 95, the operating state calculating unit 59 calculates the operating state of each object point. The operating state calculating unit 59 calculates a variable of at least one selected from a group of the speed and the acceleration of the object point. The operating state calculating unit 59 in the present embodiment calculates both the speed and acceleration of the object point. The operating state calculating unit 59 can calculate the speed and acceleration of the object point based on the position of the object point at each time point.

With reference to FIG. 6, for example, the operating state calculating unit 59 can calculate the speed of the object point 84 based on the movement distance and the movement time (time interval) between the movement points MP (object points 84) adjacent to each other. The operating state calculating unit 59 can calculate the acceleration based on the speed difference between the movement points MP (object points 84) adjacent to each other and the movement time (time interval). The operating state calculating unit 59 can calculate at least one selected from a group of the speed and the acceleration for the object points set in all the models.

It should be noted that the operating state calculated by the operating state calculating unit 59 is not limited to the speed and acceleration, and a discretionary variable regarding the operation can be calculated. For example, the jerk of the object point may be calculated. Alternatively, when the object point moves in a curved line shape, the curvature radius of the movement route may be calculated.

Next, in step 96, the display control unit 60 displays, on the display part 52, information regarding the speed and acceleration of the object point. In this case, the display control unit 60 displays the calculated speeds and accelerations of all the object points. As a display method of the operating state, numerical values of the respective variables may be displayed in time series. Alternatively, the form of a graph of each variable may be displayed.

The display control unit 60 can calculate information regarding at least one variable based on the calculated speed and acceleration. For example, the display control unit 60 can display a variable of at least one selected from a group of the maximum speed and the maximum acceleration. The display control unit 60 can display the time and the position of the object point when the maximum speed or the maximum acceleration occurs. For example, the position and time of the object point of the workpiece at which the maximum speed occurs in the workpiece can be displayed.

As a comparative example, there is a simulation device configured to calculate a centroid position of a work tool attached to a robot and perform simulation. However, there is a case where it is difficult to calculate the centroid position of the work tool. Alternatively, in a hand having a claw or the like, the centroid position changes when the claw is driven. For such a work tool, there is a case where it is difficult to perform simulation in consideration of the centroid position. On the other hand, in the simulation device of the present embodiment, the object point is set on the surface of a discretionary member by using the polygon at the time of creating animation. Then, the operating state of the member is calculated based on the position of the object point. Therefore, the operating state of a discretionary member can be calculated by a simple method.

In the above embodiment, the workpiece has been mainly described as an example of an object whose operating state is to be acquired, but the embodiment is not limited to this. The operating state such as a speed and an acceleration can be calculated for a discretionary member included in the robot system.

In other words, with reference to FIG. 3, in the present embodiment, the models of the constituent members of the robot such as the upper arm model 11M and the lower arm model 12M included in the robot model 1M are generated by polygons. The work tool model 2M is formed of a polygon.

Therefore, the object point can be set to a discretionary constituent member in the robot device model 9M. It is possible to calculate the operating state such as a speed for an object point of a discretionary member. For example, the maximum speed and the maximum acceleration can be calculated in the suction member model 27M.

For example, a servo gun for performing spot welding may be disposed as a work tool. When the servo gun rapidly rotates about the drive axis J6, the maximum speed and the maximum acceleration of a discretionary part of the servo gun when the servo gun rotates are unknown. Alternatively, the position and time of the servo gun at which the maximum speed and the maximum acceleration occur are unknown. However, in the simulation device of the present embodiment, it is possible to acquire information regarding the speed and acceleration when the servo gun moves.

In the above embodiment, when the operator does not designate the specific point, the object point setting unit sets the object point at the corners of all the polygons of the three-dimensional model. In other words, the object point is set to the polygons of the models of all the constituent members of the robot device and the workpiece included in the robot system, but the embodiment is not limited to this. The operator may designate the range in which the object point is set.

For example, the operator can designate in advance a member for setting the object point by operating the input part. The object point setting unit can set the object point on the member designated by the operator. For example, the operator can designate a workpiece, a hand, and an upper arm as members for setting the object point. The object point setting unit can set the object points to all corners of the polygons of the workpiece, the hand, and the upper arm.

Alternatively, the operator can designate in advance a range of a part of the member for setting the object point. For example, the operator can designate a range of the tip end of the work tool. Such a range can be designated in an image of simulation by the operator operating the input part, for example. The object point setting unit can set the object point for the polygon included in the range designated by the operator.

In the above embodiment, the object point is set at the corner of the polygon as an element in which the surface is divided, but the embodiment is not limited to this. The object point can be set at a discretionary position in the polygon. For example, the object point can be set at the centroid position of the polygon. Alternatively, the object point can be set at a midpoint of each side of the polygon.

Next, there is a case where the position of a member whose operating state such as a speed and an acceleration is desired to be acquired is determined. In this case, the operator can designate this position as a specific point in advance in place of the object point described above. For example, the operator can designate the specific point in the image displayed on the display part.

With reference to FIG. 5, for example, by operating the input part 51, the operator can set, as a specific point 85, the midpoint of one lower side of the workpiece model 81M displayed on the display part 52. The specific point 85 can be set to a discretionary point regardless of the polygons 87*a* to 87*f*. Alternatively, the operator may set, as specific points, the positions related to the polygons 87*a* to 87*f*. For example, the operator may set a point of one corner of the polygon as a specific point.

With reference to FIG. 4, in step 92, when the operator designates the specific point 85, the control proceeds to step 97. In step 97, the specific point setting unit 61 sets the specific point 85 designated by the operator for the robot device model 9M or the workpiece model 81M.

The simulation executing unit 56 executes simulation of the robot device 9. The position calculating unit 58 calculates the position of the specific point 85 with the coordinate values of the robot coordinate system 71. For example, the position calculating unit 58 calculates the position in the tool coordinate system 73 of the specific point 85 set in the workpiece model 81M. In other words, the position calculating unit 58 calculates, with the coordinate values of the tool coordinate system 73, the relative position of the specific point 85 with respect to the position of the robot. The position calculating unit 58 calculates the position in the robot coordinate system 71 of the specific point 85 based on the coordinate value of the specific point 85 in the tool coordinate system 73 and the position and orientation of the robot 1. The position calculating unit 58 repeats calculation of the position of the specific point 85 at predetermined time points during a period in which simulation is performed.

Next, in step 98, the operating state calculating unit 59 calculates a variable of at least one selected from a group of the speed and the acceleration of the specific point 85 based on the position of the specific point 85 at the predetermined times. In this example, the operating state calculating unit 59 calculates the speed and the acceleration of the specific point.

Next, in step 99, the display control unit 60 displays, on the display part 52, information regarding the speed and acceleration of the specific point. For example, the speed and acceleration at predetermined time intervals are displayed in time series.

As described above, the simulation device of the present embodiment can calculate and display the operating state at the specific point designated by the operator.

In the simulation device of the present embodiment, the operator can acquire information regarding the speed and acceleration of the object point or information regarding the speed and acceleration of the specific point. Then, the operator can determine whether or not the speed or the acceleration of a constituent member such as the workpiece or the work tool is small. For example, when the speed or the acceleration of the workpiece and the work tool is small, it is possible that modification of the operation program is performed to increase the speed or the acceleration at which the robot is driven. As a result, the work time can be shortened. On the other hand, when the speed or the acceleration of the workpiece, the work tool, or the like is large, it is possible that modification of the operation program is performed so as to decrease the speed or the acceleration at which the robot is driven.

For example, there is a case where acceleration that may be applied to the workpiece is predetermined. As a result of performing the simulation, there is a case where maximum acceleration of the object point of the workpiece exceeds a predetermined upper limit value. In this case, the operator can decrease the acceleration of the operation of the robot so that the maximum acceleration of the workpiece decreases, or change the movement route of the robot.

As described above, the off-line simulation device of the present embodiment can calculate information regarding the operating state of the robot device or the operating state of the workpiece from animation using the three-dimensional model. The simulation device of the present embodiment can automatically set an object point by using a polygon to be used for creating animation, and easily calculate an operating state such as a speed and an acceleration of the object point. Alternatively, the simulation device of the present embodiment can acquire a specific point designated by the operator at a discretionary position of a discretionary member and easily calculate an operating state such as a speed and an acceleration of the specific point.

The operator can modify the operation program with reference to the operating states of the robot device, the workpiece, and the like. Then, the controller 4 of the robot device 9 can drive the robot device 9 with the corrected operation program.

The processing unit of the simulation device of the present embodiment is configured by the arithmetic processing device other than the controller of the robot, but the embodiment is not limited to this. The controller for the robot may have the function of the simulation device. In other words, the processor of the arithmetic processing device of the controller may function as a processing unit of the simulation device. In this case, the display part of the teach pendant functions as a display part of the simulation device. The display part of the teach pendant can display animation of the robot device model. Furthermore, when the teach pendant includes an arithmetic processing device having a processor, the teach pendant may have the function of the simulation device. In other words, the processor of the teach pendant may function as the processing unit of the simulation device.

The above embodiments can be combined as appropriate. In each of the above-described controls, the order of steps can be changed appropriately to the extent that the functions and actions are not changed. In each of the above-described drawings, identical or equivalent parts are denoted by an identical reference sign. The above embodiments are examples and do not limit the invention. The embodiment includes modifications of the embodiments described in the claims.

REFERENCE SIGNS LIST

1 Robot
1M Robot model
2 Work tool
2M Work tool model
4 Controller
5 Simulation device
9 Robot device
9M Robot device model
51 Input part
52 Display part
54 Processing unit
55 Model generating unit
56 Simulation executing unit
57 Object point setting unit
58 Position calculating unit
59 Operating state calculating unit
60 Display control unit
61 Specific point setting unit
81 Workpiece
81M Workpiece model
84 Object point
85 Specific point
87*a* to 87*f* Polygon

The invention claimed is:

1. A simulation device configured to simulate an operation of a robot device including a robot and a work tool, the simulation device comprising:

a simulation executing unit configured to perform simulation of an operation of a robot device and an operation of a workpiece by a three-dimensional model;

an object point setting unit configured to set object points for a plurality of elements representing a surface of a three-dimensional model;

a position calculating unit configured to calculate positions at predetermined time points for all the object points during a period in which simulation is performed;

an operating state calculating unit configured to calculate a variable of at least one selected from a group of a speed and an acceleration of the object point based on a position of the object point at each time point; and a display part configured to display information regarding at least one variable calculated by the operating state calculating unit.

2. The simulation device of claim 1, wherein the element has a polygonal shape, and the object point setting unit is configured to set the object point at all corners of the element.

3. The simulation device of claim 1, wherein the operating state calculating unit is configured to calculate at least one selected from a group of a maximum speed and a maximum acceleration of the object point.

4. The simulation device of claim 1, comprising a specific point setting unit configured to set a specific point in a robot device or a workpiece in response to an input operation of an operator, wherein the position calculating unit is configured to calculate a position of the specific point at a predetermined time point during a period in which simulation is performed, and the operating state calculating unit is configured to calculate a variable of at least one selected from a group of a speed and an acceleration of the specific point.

* * * * *